(12) United States Patent
Barnes et al.

(10) Patent No.: US 12,465,395 B2
(45) Date of Patent: Nov. 11, 2025

(54) DE QUERVAIN'S TREATMENT DEVICE

(71) Applicant: Sonex Health, Inc., Eagan, MN (US)

(72) Inventors: Darryl E. Barnes, Eagan, MN (US); Jay Smith, Byron, MN (US); David Herridge, Mendota Heights, MN (US)

(73) Assignee: SONEX HEALTH, INC., Eagan, MN (US)

( * ) Notice: Subject to any disclaimer, the term of this patent is extended or adjusted under 35 U.S.C. 154(b) by 188 days.

(21) Appl. No.: 18/237,087

(22) Filed: Aug. 23, 2023

(65) Prior Publication Data

US 2024/0065726 A1 Feb. 29, 2024

Related U.S. Application Data

(60) Provisional application No. 63/401,018, filed on Aug. 25, 2022.

(51) Int. Cl.
*A61B 17/3211* (2006.01)
*A61B 90/00* (2016.01)
(Continued)

(52) U.S. Cl.
CPC .......... *A61B 17/3211* (2013.01); *A61B 90/39* (2016.02); *A61B 2017/32113* (2013.01); *A61B 2090/3925* (2016.02)

(58) Field of Classification Search
CPC ...... A61B 17/320016; A61B 17/32004; A61B 17/320056; A61B 17/320036;
(Continued)

(56) References Cited

U.S. PATENT DOCUMENTS

| 2,123,768 A | 7/1938 | Corsico-Piccolini et al. |
| 3,435,826 A | 4/1969 | Fogarty |
| (Continued) | | |

FOREIGN PATENT DOCUMENTS

| DE | 4444166 A1 | 6/1996 |
| EP | 3278749 A1 | 2/2018 |
| (Continued) | | |

OTHER PUBLICATIONS

U.S. Appl. No. 62/086,950, filed Dec. 3, 2014 (52 pages).
(Continued)

*Primary Examiner* — Tan-Uyen T Ho
*Assistant Examiner* — Lindsey R. Rivers
(74) *Attorney, Agent, or Firm* — Seager, Tufte & Wickhem, LLP

(57) ABSTRACT

A device for treating de Quervain's tenosynovitis may include a handle, an introducer shaft extending from the handle, and a blade that includes a blade shaft extending along a top surface of the introducer shaft and onto the handle and a blade cutting edge that faces toward the handle. The device may further include a blade slider attached to a proximal portion of the blade shaft, a blade pivot attached to at least one of the proximal portion of the blade shaft or the blade slider, an upper deck along which the blade slider slides in an upper horizontal orientation, and a lower deck along which the blade slider slides in a lower horizontal orientation. The blade pivot is configured to allow the blade slider to rotate in a plane that is perpendicular to a plane of the introducer shaft.

20 Claims, 10 Drawing Sheets

(51) Int. Cl.
*A61B 17/00* (2006.01)
*A61B 17/32* (2006.01)

(58) Field of Classification Search
CPC ............ A61B 17/3211; A61B 17/1146; A61B 17/3213; A61B 2017/00924; A61B 2017/32113; A61B 2017/32116; A61B 2017/3213; A61B 90/39; A61B 2090/036; A61B 2090/3925; A61F 2/08
See application file for complete search history.

(56) References Cited

U.S. PATENT DOCUMENTS

| | | |
|---|---|---|
| 4,962,770 A | 10/1990 | Agee et al. |
| 4,963,147 A | 10/1990 | Agee et al. |
| 4,979,951 A | 12/1990 | Simpson |
| 5,089,000 A | 2/1992 | Agee et al. |
| 5,125,927 A | 6/1992 | Belanger |
| 5,217,007 A | 6/1993 | Ciaglia |
| 5,306,284 A | 4/1994 | Agee et al. |
| 5,325,883 A | 7/1994 | Orr |
| 5,345,927 A | 9/1994 | Bonutti |
| 5,353,812 A | 10/1994 | Chow |
| 5,425,355 A | 6/1995 | Kulick |
| 5,480,408 A | 1/1996 | Chow |
| 5,569,283 A | 10/1996 | Green et al. |
| 5,620,446 A | 4/1997 | McNamara et al. |
| 5,649,946 A | 7/1997 | Bramlet |
| 5,655,545 A | 8/1997 | Johnson et al. |
| 5,690,663 A | 11/1997 | Stephens |
| 5,690,664 A | 11/1997 | Sauer et al. |
| 5,702,417 A | 12/1997 | Hermann |
| 5,707,382 A | 1/1998 | Sierocuk et al. |
| 5,709,697 A | 1/1998 | Ratcliff et al. |
| 5,735,865 A | 4/1998 | Schaumann et al. |
| 5,755,732 A | 5/1998 | Green et al. |
| 5,766,198 A | 6/1998 | Li |
| 5,769,865 A | 6/1998 | Kermode et al. |
| 5,769,895 A | 6/1998 | Ripamonti |
| 5,772,680 A | 6/1998 | Kieturakis et al. |
| 5,779,053 A | 7/1998 | Partika et al. |
| 5,782,850 A | 7/1998 | Ro |
| 5,782,854 A | 7/1998 | Hermann |
| 5,800,449 A | 9/1998 | Wales |
| 5,810,806 A | 9/1998 | Ritchart et al. |
| 5,813,977 A | 9/1998 | Hinchliffe et al. |
| 5,827,311 A | 10/1998 | Berelsman et al. |
| 5,860,997 A | 1/1999 | Bonutti |
| 5,865,728 A | 2/1999 | Moll et al. |
| 5,893,861 A | 4/1999 | Yumoto |
| 5,904,699 A | 5/1999 | Schwemberger et al. |
| 5,908,433 A | 6/1999 | Eager et al. |
| 5,954,739 A | 9/1999 | Bonutti |
| 5,957,944 A | 9/1999 | Khuri et al. |
| 5,968,061 A | 10/1999 | Mirza |
| 6,004,337 A | 12/1999 | Kieturakis et al. |
| 6,007,554 A | 12/1999 | Van Ess |
| 6,012,586 A | 1/2000 | Misra |
| 6,015,421 A | 1/2000 | Echverry et al. |
| 6,017,356 A | 1/2000 | Frederick et al. |
| 6,019,774 A | 2/2000 | Weiss et al. |
| 6,030,402 A | 2/2000 | Thompson et al. |
| 6,080,175 A | 6/2000 | Hogendijk |
| 6,083,177 A | 7/2000 | Kobren et al. |
| 6,106,496 A | 8/2000 | Amnissolle |
| 6,113,617 A | 9/2000 | van der Merwe |
| 6,117,153 A | 9/2000 | Lary et al. |
| 6,168,608 B1 | 1/2001 | Echeverry et al. |
| 6,171,236 B1 | 1/2001 | Bonutti |
| 6,179,852 B1 | 1/2001 | Strickland |
| 6,217,602 B1 | 4/2001 | Redmon |
| 6,258,113 B1 | 7/2001 | Adams et al. |
| 6,264,604 B1 | 7/2001 | Kieturakis et al. |
| 6,346,085 B1 | 2/2002 | Schiffman |
| 6,358,251 B1 | 3/2002 | Mirza |
| 6,361,543 B1 | 3/2002 | Chin et al. |
| 6,402,770 B1 | 6/2002 | Jessen |
| 6,447,529 B2 | 9/2002 | Fogarty et al. |
| 6,451,042 B1 | 9/2002 | Bonutti |
| 6,514,272 B1 | 2/2003 | Kieturakis et al. |
| 6,565,590 B2 | 5/2003 | Kieturakis et al. |
| 6,592,602 B1 | 7/2003 | Pearetree et al. |
| 6,632,234 B2 | 10/2003 | Kieturakis et al. |
| 6,685,717 B1 | 2/2004 | Ilic |
| 6,746,465 B2 | 6/2004 | Diedrich et al. |
| 6,875,183 B2 | 4/2005 | Cervi |
| 6,896,141 B2 | 5/2005 | McMichael et al. |
| 7,001,405 B2 | 2/2006 | Kieturakis et al. |
| 7,037,317 B2 | 5/2006 | Hermann et al. |
| 7,214,236 B2 | 5/2007 | Kieturakis et al. |
| 7,329,253 B2 | 2/2008 | Brounstein et al. |
| 7,331,462 B2 | 2/2008 | Steppe |
| 7,434,687 B2 | 10/2008 | Itou et al. |
| 7,476,235 B2 | 1/2009 | Diederich et al. |
| 7,481,817 B2 | 1/2009 | Sauer |
| 7,504,875 B2 | 3/2009 | Bhushan et al. |
| 7,520,886 B2 | 4/2009 | Surti |
| 7,628,798 B1 | 12/2009 | Welborn |
| 7,708,751 B2 | 5/2010 | Hughes et al. |
| 7,744,617 B2 | 6/2010 | Lunsford et al. |
| 7,780,690 B2 | 8/2010 | Rehnke |
| 7,918,784 B2 | 4/2011 | Wellborn et al. |
| 7,967,137 B2 | 6/2011 | Fulbrook et al. |
| D645,147 S | 9/2011 | Ruf |
| 8,052,710 B2 | 11/2011 | Kambin et al. |
| 8,105,342 B2 | 1/2012 | Onuki et al. |
| 8,136,251 B2 * | 3/2012 | Endo .................. B26B 1/08 30/162 |
| 8,147,487 B2 | 4/2012 | Burbank et al. |
| 8,177,064 B2 | 5/2012 | McCormick et al. |
| 8,246,646 B2 | 8/2012 | Kambin |
| 8,252,013 B2 | 8/2012 | Leibowitz et al. |
| D666,725 S | 9/2012 | McCormack et al. |
| 8,257,379 B2 | 9/2012 | Lee |
| 8,273,098 B2 | 9/2012 | Strickland |
| 8,282,665 B2 | 10/2012 | Kieturakis et al. |
| 8,323,278 B2 | 12/2012 | Brecheen et al. |
| D673,683 S | 1/2013 | McCormack et al. |
| D674,489 S | 1/2013 | McCormack et al. |
| 8,348,966 B2 | 1/2013 | McCormack et al. |
| 8,419,728 B2 | 4/2013 | Klotz et al. |
| 8,449,478 B2 | 5/2013 | Lee et al. |
| 8,500,770 B2 | 8/2013 | Echevery et al. |
| 8,523,891 B2 | 9/2013 | Welborn |
| 8,579,930 B2 | 11/2013 | Palmer et al. |
| 8,603,124 B1 | 12/2013 | Hatch |
| 8,603,738 B2 | 12/2013 | Condeelis et al. |
| 8,608,738 B2 | 12/2013 | Brecheen et al. |
| 8,608,763 B1 | 12/2013 | Jurbala |
| 8,613,745 B2 | 12/2013 | Bleich |
| 8,652,157 B2 | 2/2014 | McCormack et al. |
| 8,672,960 B2 | 3/2014 | Briganti et al. |
| 8,702,654 B2 | 4/2014 | Agee et al. |
| 8,721,668 B2 | 5/2014 | McCormack et al. |
| 8,746,452 B2 | 6/2014 | Tomes et al. |
| 8,753,364 B2 | 6/2014 | McCormack et al. |
| 8,876,845 B2 | 11/2014 | Suddaby |
| 8,906,040 B2 | 12/2014 | Filipi et al. |
| 8,911,470 B2 | 12/2014 | Mirza et al. |
| 8,951,273 B1 | 2/2015 | Fard |
| 8,992,424 B2 | 3/2015 | Orbay et al. |
| 9,017,354 B2 | 4/2015 | Fink et al. |
| 9,028,516 B2 | 5/2015 | Palmer et al. |
| 9,050,004 B2 | 6/2015 | Diao et al. |
| D735,330 S | 7/2015 | Rydberg et al. |
| D735,332 S | 7/2015 | Allen et al. |
| 9,113,953 B2 | 8/2015 | Smith |
| 9,131,951 B2 | 9/2015 | Mirza et al. |
| 9,168,057 B2 | 10/2015 | Poulsen |
| 9,186,217 B2 | 11/2015 | Goyal |
| D745,675 S | 12/2015 | Jankowski et al. |
| 9,456,837 B1 | 10/2016 | Jurbala |
| 9,532,847 B2 | 1/2017 | Hendrickson et al. |
| 10,206,703 B2 | 2/2019 | Palmer et al. |

(56) References Cited

U.S. PATENT DOCUMENTS

| | | | |
|---|---|---|---|
| 10,245,062 B2 | 4/2019 | Seymour | |
| 10,383,609 B2 | 8/2019 | Nakanishi et al. | |
| 10,413,313 B2 | 9/2019 | Brown et al. | |
| D864,388 S | 10/2019 | Barber | |
| 10,575,867 B2 | 3/2020 | Mirza et al. | |
| 10,918,410 B2 | 2/2021 | Mirza et al. | |
| 11,006,970 B2 | 5/2021 | Mirza et al. | |
| 11,096,710 B2 | 8/2021 | Mirza et al. | |
| 11,096,720 B2 | 8/2021 | Mirza et al. | |
| 11,259,837 B2 | 3/2022 | Aklog et al. | |
| D969,316 S | 11/2022 | Milhous et al. | |
| D974,561 S | 1/2023 | Walsh | |
| 2002/0120211 A1 | 8/2002 | Wardle et al. | |
| 2002/0161387 A1 | 10/2002 | Blanco | |
| 2002/0185406 A1 | 12/2002 | Massengale et al. | |
| 2004/0143280 A1 | 7/2004 | Suddaby | |
| 2004/0195131 A1 | 10/2004 | Spolidoro | |
| 2005/0209624 A1 | 9/2005 | Vijay | |
| 2005/0222598 A1 | 10/2005 | Ho et al. | |
| 2005/0228426 A1 | 10/2005 | Campbell | |
| 2006/0149136 A1 | 7/2006 | Seto et al. | |
| 2006/0190021 A1 | 8/2006 | Hausman et al. | |
| 2007/0083225 A1 | 4/2007 | Kiser et al. | |
| 2007/0112366 A1 | 5/2007 | Welborn et al. | |
| 2007/0118170 A1 | 5/2007 | Kieturakis et al. | |
| 2007/0225740 A1 | 9/2007 | Suddaby | |
| 2008/0033466 A1 | 2/2008 | Assell et al. | |
| 2008/0058588 A1 | 3/2008 | Emanuel | |
| 2008/0058846 A1 | 3/2008 | Vosough | |
| 2008/0109021 A1* | 5/2008 | Medoff | A61B 17/320036 606/167 |
| 2008/0195128 A1 | 8/2008 | Orbay et al. | |
| 2008/0234713 A1 | 9/2008 | Bernardini | |
| 2008/0288041 A1 | 11/2008 | Holman et al. | |
| 2009/0048620 A1 | 2/2009 | Weiss et al. | |
| 2009/0048623 A1 | 2/2009 | Lafosse et al. | |
| 2009/0125044 A1 | 5/2009 | Lary | |
| 2009/0171157 A1 | 7/2009 | Diederich et al. | |
| 2009/0312740 A1 | 12/2009 | Kim et al. | |
| 2009/0312807 A1 | 12/2009 | Boudreault et al. | |
| 2010/0010530 A1 | 1/2010 | Rhee | |
| 2010/0100114 A1 | 4/2010 | Berger | |
| 2010/0125266 A1 | 5/2010 | Deem et al. | |
| 2010/0185222 A1 | 7/2010 | Keller | |
| 2010/0211082 A1 | 8/2010 | Sauer | |
| 2010/0249719 A1 | 9/2010 | Fojtik | |
| 2011/0087258 A1 | 4/2011 | Sluss | |
| 2011/0112563 A1 | 5/2011 | To et al. | |
| 2011/0118601 A1 | 5/2011 | Barnes | |
| 2011/0155599 A1 | 6/2011 | Yakel et al. | |
| 2011/0201881 A1 | 8/2011 | Emch | |
| 2012/0016398 A1 | 1/2012 | Strickland | |
| 2012/0029542 A1 | 2/2012 | Huang | |
| 2012/0029543 A1 | 2/2012 | Lee | |
| 2012/0191116 A1 | 7/2012 | Flynn et al. | |
| 2012/0198703 A1 | 8/2012 | Ranieri et al. | |
| 2012/0203220 A1 | 8/2012 | Brannan et al. | |
| 2012/0289987 A1 | 11/2012 | Wilson et al. | |
| 2012/0303018 A1 | 11/2012 | Ladtkow et al. | |
| 2013/0046323 A1 | 2/2013 | Whitaker | |
| 2013/0066149 A1 | 3/2013 | Mirza et al. | |
| 2013/0144318 A1 | 6/2013 | Dinis Carmo | |
| 2013/0165962 A1 | 6/2013 | Porshinsky et al. | |
| 2013/0172895 A1 | 7/2013 | Wallace et al. | |
| 2013/0197553 A1 | 8/2013 | Ng et al. | |
| 2013/0211201 A1 | 8/2013 | Wongsiri | |
| 2013/0289596 A1 | 10/2013 | Guo | |
| 2013/0345515 A1 | 12/2013 | Fitzmaurice | |
| 2014/0012076 A1 | 1/2014 | Mirza et al. | |
| 2014/0031621 A1 | 1/2014 | Liu | |
| 2014/0039533 A1 | 2/2014 | Palmer et al. | |
| 2014/0054356 A1 | 2/2014 | Hartwick et al. | |
| 2014/0066709 A1 | 3/2014 | Mirza et al. | |
| 2014/0180282 A1 | 6/2014 | Brecheen et al. | |
| 2014/0212456 A1 | 7/2014 | Vazquez-Cintron et al. | |
| 2014/0276741 A1 | 9/2014 | McKay | |
| 2014/0276790 A1 | 9/2014 | Raybin et al. | |
| 2014/0343357 A1 | 11/2014 | Mirza et al. | |
| 2014/0371526 A1 | 12/2014 | Mirza et al. | |
| 2015/0045822 A1 | 2/2015 | Mirza et al. | |
| 2015/0073461 A1 | 3/2015 | McCormack et al. | |
| 2015/0080878 A1 | 3/2015 | Feng et al. | |
| 2015/0080905 A1 | 3/2015 | Begemann et al. | |
| 2015/0133982 A1 | 5/2015 | Park | |
| 2015/0182248 A1 | 7/2015 | Palmer et al. | |
| 2015/0196743 A1 | 7/2015 | Diederich et al. | |
| 2015/0201959 A1 | 7/2015 | Guo | |
| 2015/0265818 A1 | 9/2015 | Piskun et al. | |
| 2015/0282832 A1 | 10/2015 | Mirza et al. | |
| 2015/0320436 A1 | 11/2015 | Agee et al. | |
| 2016/0081710 A1 | 3/2016 | Barnes et al. | |
| 2016/0157880 A1 | 6/2016 | Aklog et al. | |
| 2016/0235431 A1 | 8/2016 | Brown et al. | |
| 2017/0042565 A1 | 2/2017 | Ellsworth et al. | |
| 2017/0042566 A1 | 2/2017 | Mirza et al. | |
| 2017/0086803 A1 | 3/2017 | Nakanishi et al. | |
| 2017/0105792 A1 | 4/2017 | Barnes et al. | |
| 2017/0143364 A1 | 5/2017 | Mirza et al. | |
| 2019/0262024 A1 | 8/2019 | Barnes et al. | |
| 2019/0343546 A1 | 11/2019 | Brown et al. | |
| 2020/0078039 A1 | 3/2020 | Mirza et al. | |
| 2020/0107850 A1 | 4/2020 | Mirza et al. | |
| 2020/0197039 A1 | 6/2020 | Hatch | |
| 2021/0077139 A1 | 3/2021 | Mirza et al. | |
| 2021/0369293 A1 | 12/2021 | Moungondo | |
| 2022/0022909 A1 | 1/2022 | Lins et al. | |
| 2022/0346819 A1 | 11/2022 | Barnes et al. | |
| 2022/0354527 A1 | 11/2022 | Barnes | |

FOREIGN PATENT DOCUMENTS

| | | |
|---|---|---|
| WO | 2007016141 A2 | 2/2007 |
| WO | 2010065707 A2 | 6/2010 |
| WO | 2012089767 A1 | 7/2012 |
| WO | 2013155472 A1 | 10/2013 |
| WO | 2014118752 A2 | 8/2014 |
| WO | 2014176206 A2 | 10/2014 |
| WO | 2020146458 A1 | 7/2020 |
| WO | 2020243412 A1 | 12/2020 |
| WO | 2020247476 A1 | 12/2020 |

OTHER PUBLICATIONS

International Search Report and Written Opinion mailed Feb. 15, 2016, issued in International Application No. PCT/US2015/049558 (24 pages).

Examination Report issued in European Patent Application No. 15767038.1, dated Apr. 29, 2019 (8 pages).

International Search Report and Written Opinion mailed Mar. 25, 2022, in Application No. PCT/US22/70088.

International Search Report and Written Opinion issued Sep. 21, 2020, in International Application No. PCT/US20/35094.

Extended European Search Report for Application No. 20738258.1 dated Feb. 23, 2022.

International Search Report and Written Opinion mailed Jun. 15, 2020, in Application No. PCT/US20/12682.

International Search Report and Written Opinion dated Aug. 4, 2022 for International Application No. PCT/US/2022/027039.

Invitation to Pay Additional Fees dated Mar. 31, 2023 for International Application No. PCT/US/2023/011838.

Muramatsu et al., "A Comparison of Blinded Versus Ultrasound-Guided Limited-Open Trigger Finger Release using the Yasunaga Knife," Journal of Hand Surgery, Asian Pacific, vol. 27, No. 1 pp. 124-129, Feb. 2022.

S2S Surgical™ Surgeon-2-Surgeon Innovation , Trigger Finger Release Surgial Technique, Version 1.1, 5 pages, www.S2Surgical.com 2017.

(56) References Cited

OTHER PUBLICATIONS

International Search Report and Written Opinion dated Oct. 16, 2023 for International Application No. PCT/US2023/030909.

\* cited by examiner

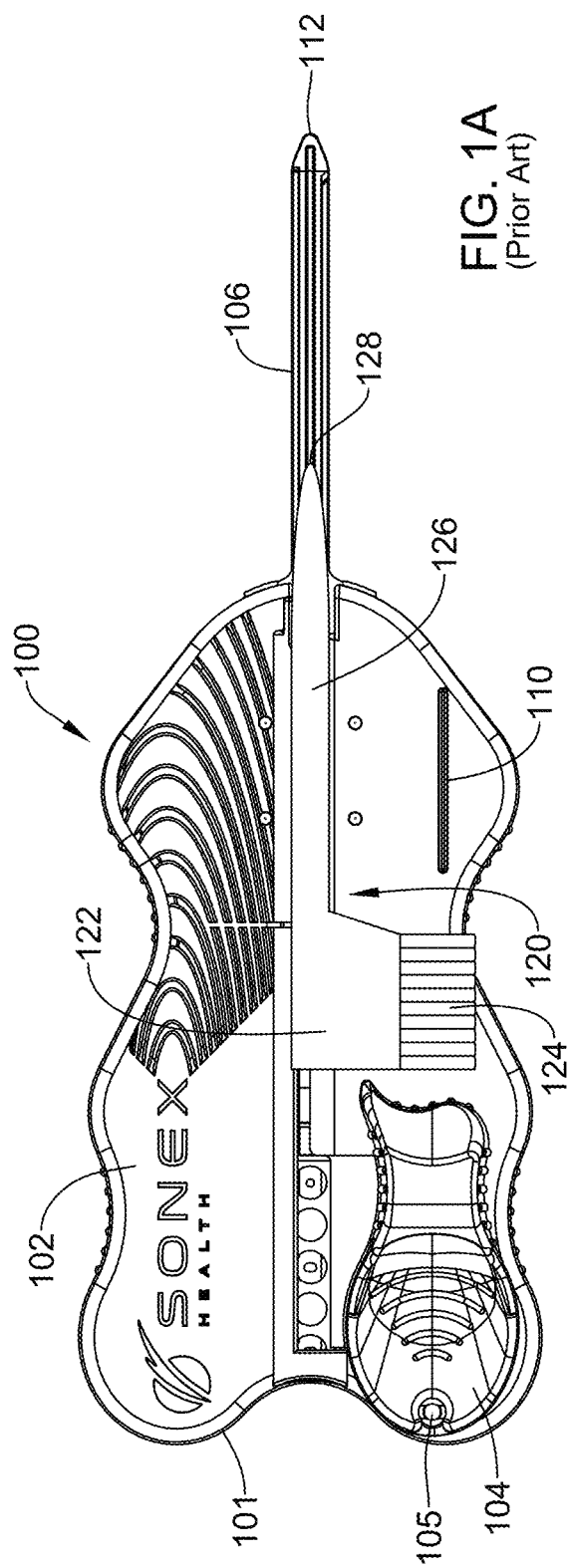
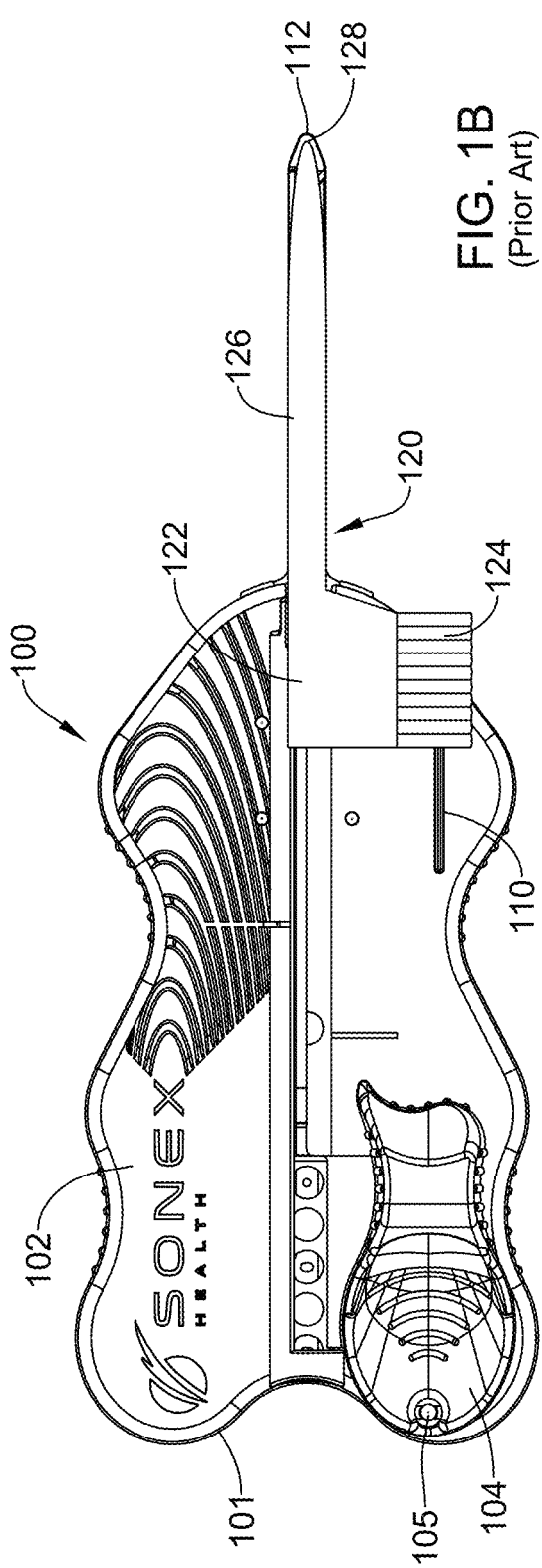
FIG. 1A (Prior Art)
FIG. 1B (Prior Art)

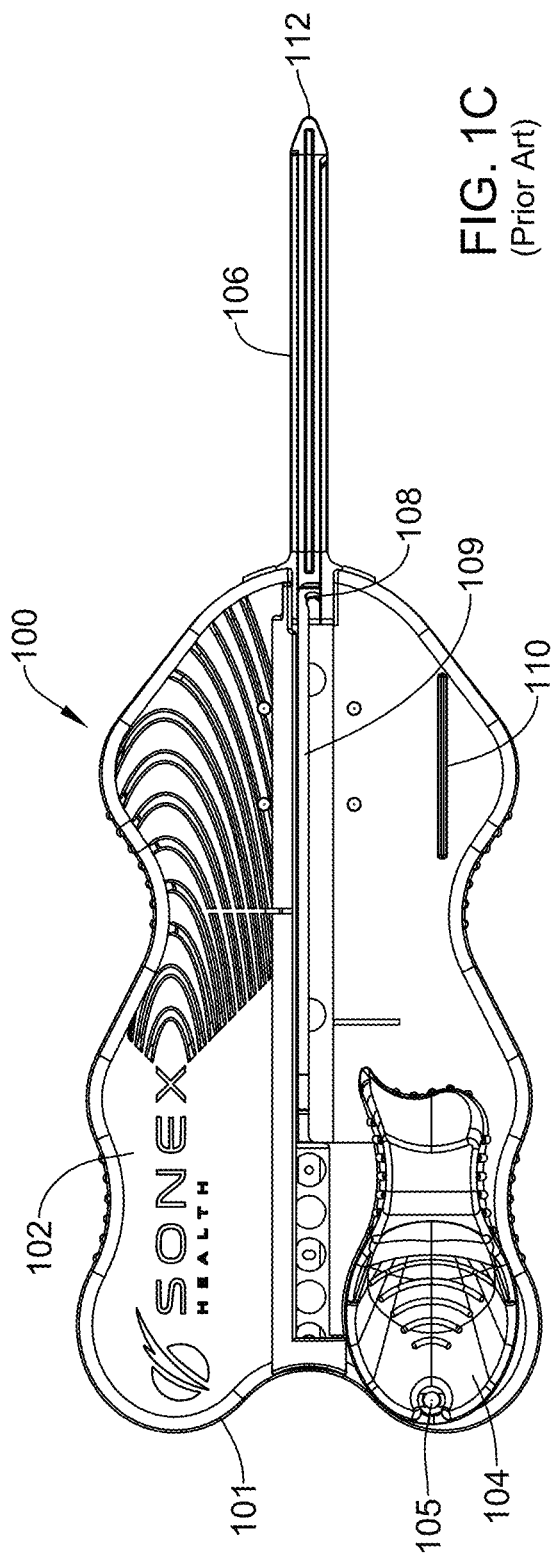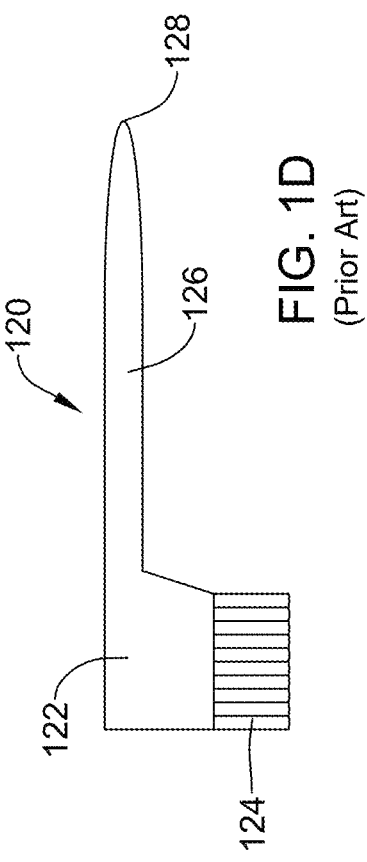
FIG. 1C (Prior Art)
FIG. 1D (Prior Art)

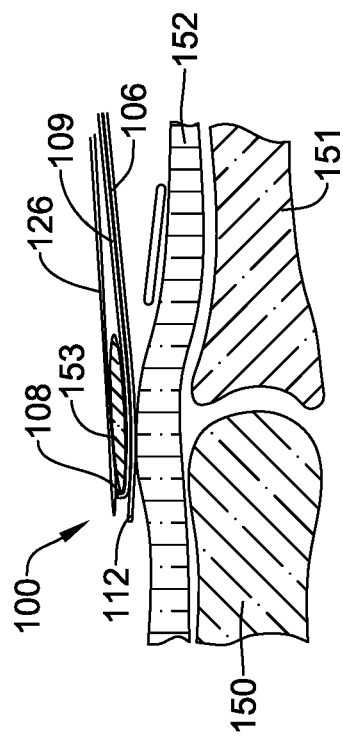
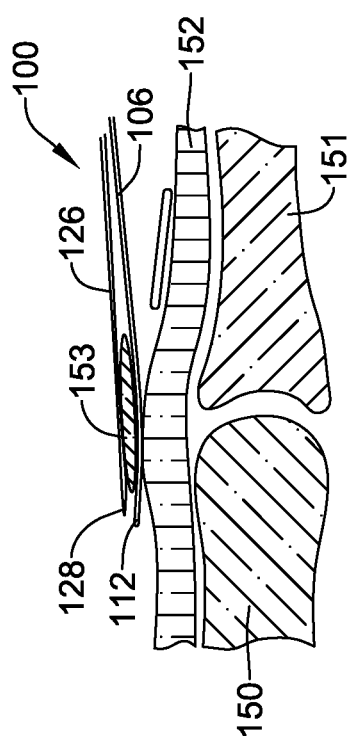

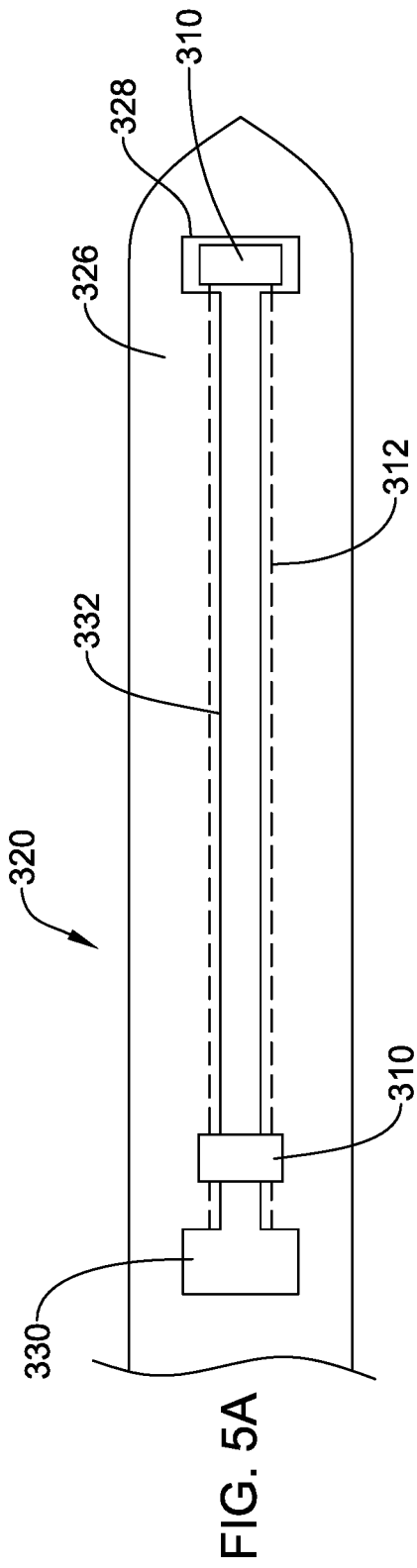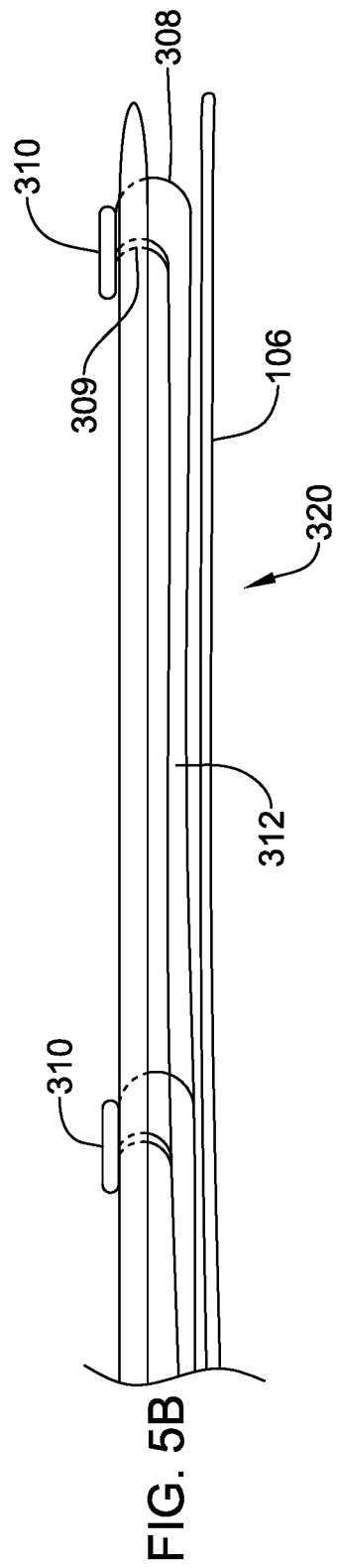

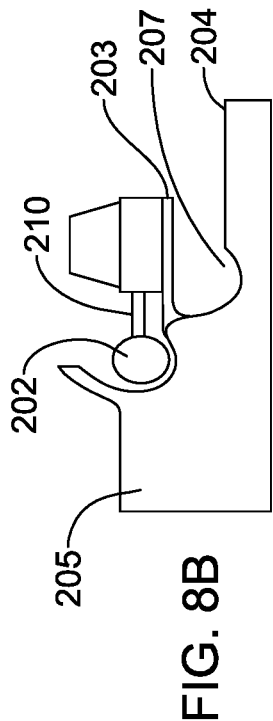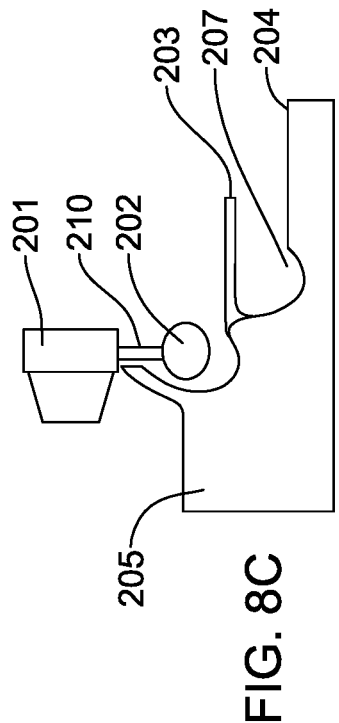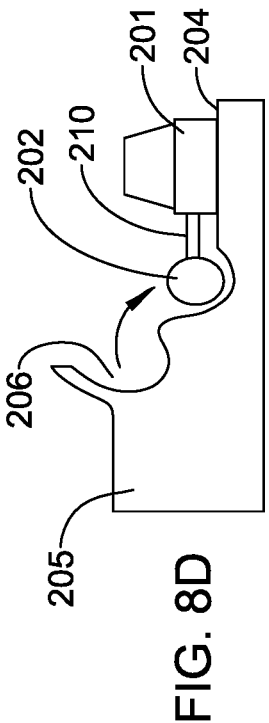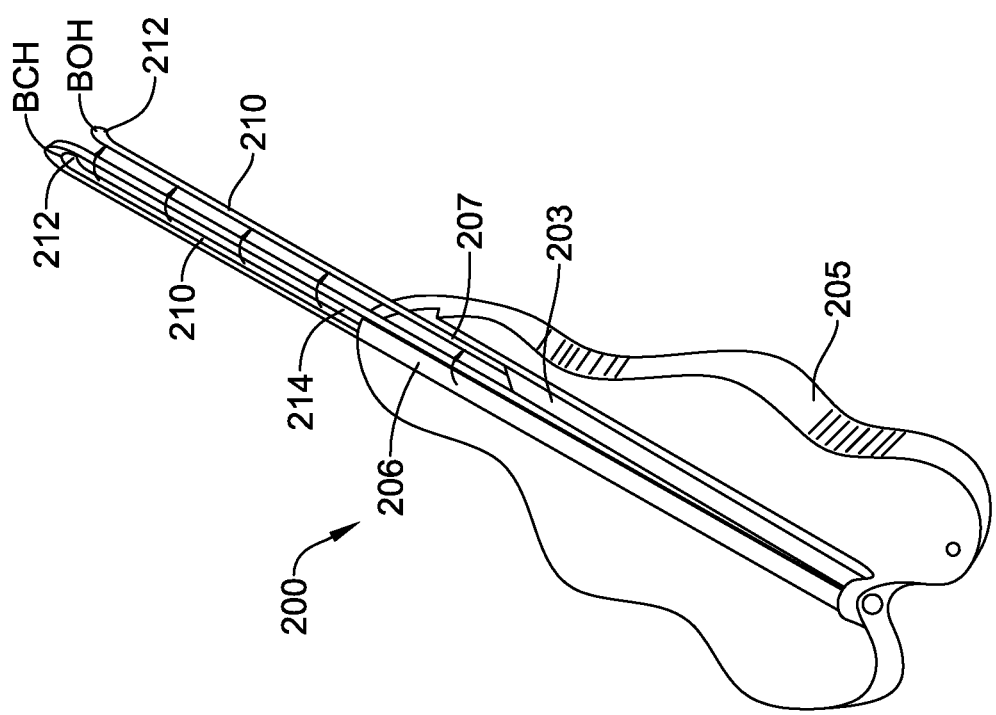

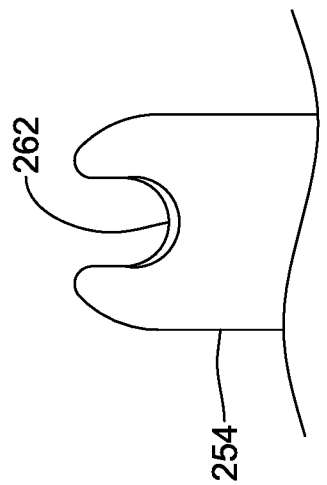
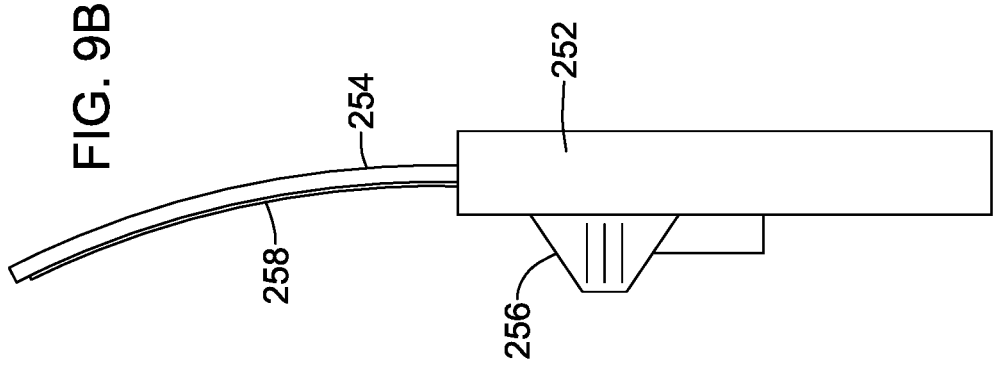
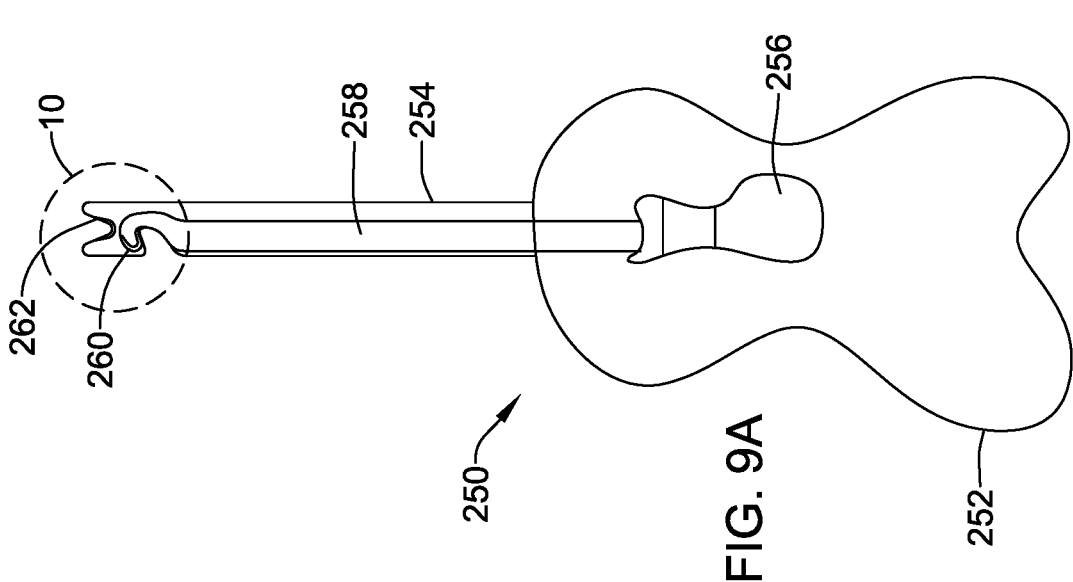

DE QUERVAIN'S TREATMENT DEVICE

CROSS REFERENCE TO RELATED APPLICATIONS

This application claims the benefit of U.S. Provisional Patent Application Ser. No. 63/401,018 entitled "THUMB TREATMENT DEVICE" and filed Aug. 25, 2022. The disclosure of which is hereby incorporated by reference in its entirety.

TECHNICAL FIELD

The present application relates generally to medical devices and methods. More specifically, the present application relates to a device and method for treating De Quervain's tenosynovitis and other soft tissue disorders of the hand, wrist, or other parts of the body.

BACKGROUND

De Quervain's tenosynovitis is a painful condition affecting the two tendons on the thumb side of the wrist. Chronic overuse, such as repeating a particular hand motion day after day, may irritate the sheath around the tendons. If the sheath becomes irritated, the tendons can thicken and swell. This thickening and swelling restrict the movement of the tendons through the small tunnel that connects them to the base of the thumb. Symptoms of de Quervain's tenosynovitis include pain and/or swelling near the base of the thumb, difficulty moving the thumb and wrist when grasping or pinching, and a sticking sensation in the thumb when moving it. In some cases, pain spreads farther into the thumb or forearm.

If conservative treatments for de Quervain's tenosynovitis do not work, surgery is a therapeutic option. In the surgical procedure, the surgeon cuts the sheath around the tendons to release the pressure and allow the tendons to glide freely. As with a trigger thumb release procedure, it is imperative, when treating de Quervain's, to avoid injuring nerve tissue and blood vessels in and around the area where the sheath is cut.

Trigger finger is another example of an ailment of the hand or wrist that is commonly treated with a release procedure. The first annular ("A1") pulley is a small band of tissue on the palmar side of a person's hand. In some cases, the flexor tendon thickens, and a nodule can get caught on the A1 pulley and cause irritation and mechanical symptoms. The flexor tendon can then become locked in place when a person flexes his or her fingers. This condition is commonly referred to as "trigger finger." To treat trigger finger, the A1 pulley is typically cut, to release the tendon.

Trigger finger can occur in any of the five fingers. Due to the orientation of the thumb relative to the hand and due to the anatomy of the thumb, treating trigger thumb presents different challenges compared to treating the other four fingers. Specifically, the locations of nerves and muscles in the thumb, relative to the A1 pulley and the flexor pollicis longus tendon, make accessing and cutting the A1 pulley to treat trigger thumb technically difficult. It is crucial to a successful trigger thumb release procedure that nerves and blood vessels of the thumb remain undamaged.

As minimally invasive surgery has evolved, numerous tools have been developed to assist in treating medical conditions that have previously been treated with open and more invasive techniques. It would be advantageous to have less invasive devices and techniques for treating de Quervain's tenosynovitis, trigger thumb, and other soft tissue ailments of the hand, wrist, and other parts of the body. Ideally, such tools and techniques would be minimally invasive or at least less invasive than traditional surgical approaches. It would also be advantageous if such devices and methods helped prevent unwanted injury to surrounding neurovascular tissues.

SUMMARY

In one aspect of the present disclosure, a device for treating de Quervain's tenosynovitis may include a handle, an introducer shaft extending from the handle, and a blade that includes a blade shaft extending along a top surface of the introducer shaft and onto the handle and a blade cutting edge that faces toward the handle. The device may further include a blade slider attached to a proximal portion of the blade shaft, a blade pivot attached to at least one of the proximal portion of the blade shaft or the blade slider, an upper deck along which the blade slider slides in an upper horizontal orientation, and a lower deck along which the blade slider slides in a lower horizontal orientation. The blade pivot is configured to allow the blade slider to rotate in a plane that is perpendicular to a plane of the introducer shaft.

In some embodiments, the device may further include a neurovascular guard disposed over the blade. The neurovascular guard is configured to slide along the handle and the introducer shaft. Sometimes, the neurovascular guard may be made of a material that allows passage of ultrasound waves. For example, the material may be, but is not limited to, polyetherimide (PEI), such as ULTEM®, PEEK, PPS, and other polymers. In some embodiments, when the neurovascular guard is placed in an advanced position, a distal tip of the neurovascular guard is located at or near a distal tip of the introducer shaft, and the blade cutting edge is located between the introducer shaft and the neurovascular guard.

In some embodiments, the device may further include an upper guideway adjacent the upper deck and a lower guideway adjacent the lower deck. In such embodiments, the blade pivot rests in and slides along the upper guideway when the blade slider is on the upper deck and the lower guideway when the blade slider is on the lower deck. The upper deck may extend along only a portion of the handle, forming an opening through which the blade pivot can move between the upper guideway and the lower guideway. The blade slider may be configured to move between three orientations via the blade pivot: a blade center horizontal orientation, in which the blade pivot rests in the upper guideway and the blade slider rests on the upper deck; a blade center vertical orientation, in which the blade pivot rests in the upper guideway and the blade slider is rotated to a more vertical position off of the upper deck; and a blade center offset orientation, in which the blade pivot rests in the lower guideway and the blade slider rests on the lower deck. The device of claim 8, wherein the blade cutting edge in the blade center offset orientation extends laterally beyond an edge of the introducer shaft. In general, the blade pivot is configured to allow the blade cutting edge to cut a first tissue in approximately a horizontal plane relative to a plane of the introducer shaft and to cut a second tissue in approximately a vertical plane relative to the plane of the introducer shaft.

In another aspect of the present disclosure, a method for treating de Quervain's tenosynovitis in a wrist of a patient may involve: advancing an introducer shaft of a treatment device under an extensor retinaculum; rotating a blade in an upper guideway of the treatment device to a first orientation that is approximately perpendicular to the introducer shaft, to position a cutting edge of the blade distal to the extensor retinaculum; moving the blade proximally to cause the cutting edge to cut through the extensor retinaculum; moving the blade from the upper guideway to a lower guideway in a second orientation that is approximately horizontal to the introducer shaft, where the cutting edge in the second orientation extends laterally beyond an edge of the introducer shaft; and moving the blade proximally to cause the cutting edge to cut through a septum.

In some embodiments, the method may further involve visualizing at least part of the method using an ultrasound device located outside of the patient. Optionally, the method may further involve advancing a neurovascular guard along the introducer shaft before rotating the blade into the first orientation, where the blade is located between the introducer shaft and the neurovascular guard. The method may also further involve advancing the blade along the introducer shaft after advancing the neurovascular guard along the introducer shaft and before rotating the blade into the first orientation.

In some embodiments, the method may involve advancing the blade along the introducer shaft after advancing the introducer shaft and before rotating the blade, where the blade is advanced along the introducer shaft in a third orientation wherein the blade is in the upper guideway and is approximately horizontal to the introducer shaft. The blade may be coupled with a blade slider configured to slide along a handle of the treatment device to slide the blade distally and proximally. The blade may also be coupled with a blade pivot configured to rest in and slide along the upper guideway and the lower guideway. Moving the blade from the upper guideway to the lower guideway may involve moving the blade pivot through an opening in an upper deck of the treatment device to position the blade slider on a lower deck of the treatment device.

The septum that is cut may, in some embodiments, be the first extensor compartment septum. In some embodiments, the septum is cut before the extensor retinaculum is cut. In some embodiments, moving the blade involves sliding and/ or rotating a blade slider of the treatment device along a handle of the treatment device, and the blade slider is coupled with a blade shaft of the blade that extends to the cutting edge of the blade.

These and other aspects and embodiments are described in more detail below, in relation to the attached drawing figures.

BRIEF DESCRIPTION OF THE DRAWINGS

FIGS. 1A and 1B are top views of a trigger thumb treatment device, according to one embodiment;

FIG. 1C is a top view of the trigger thumb treatment device of FIGS. 1A and 1B with a neurovascular guard removed;

FIG. 1D is a top view of the neurovascular guard of the trigger thumb treatment device of FIGS. 1A and 1B;

FIGS. 3A and 3B are lateral, cross-sectional views of a thumb and the trigger thumb treatment device, illustrating a method for treating trigger thumb, according to one embodiment;

FIGS. 5A and 5B are top and side views, respectively, of a neurovascular guard for a trigger thumb or de Quervain's treatment device, according to an alternative embodiment;

FIG. 8A is a perspective view of the de Quervain's treatment device of FIG. 6, with the blade slider and neurovascular guard removed to show additional detail;

FIG. 8B is a posterior view of the de Quervain's treatment device of FIG. 6, showing the blade slider in a blade central horizontal BCH orientation;

FIG. 8C is a posterior view of the de Quervain's treatment device of FIG. 6, showing the blade slider in a blade central vertical BCV orientation;

FIG. 8D is a posterior view of the de Quervain's treatment device of FIG. 6, showing the blade slider in a blade offset horizontal BOH orientation;

FIGS. 9A-9C are top, side, and close-up top views, respectively, of a treatment device used for treating de Quervain's tenosynovitis, according to an alternative embodiment.

DETAILED DESCRIPTION

Figure 2C:
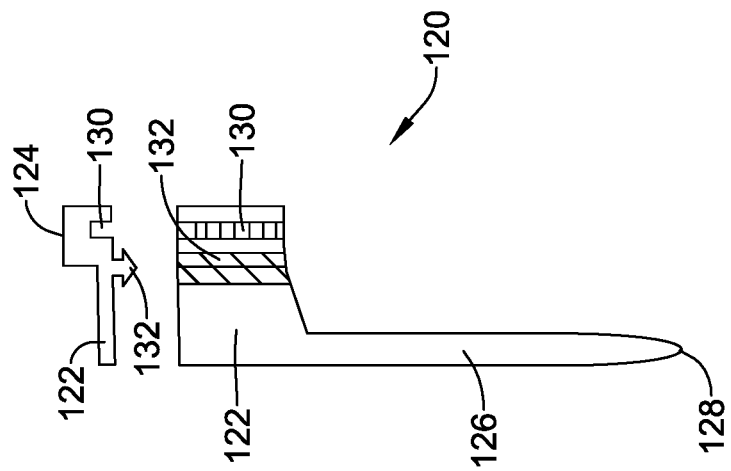
FIG. 2C is a bottom view (lower panel) and rear view (upper panel) of the neurovascular guard of FIG. 2A.

The soft tissue cutting devices and methods disclosed in this application are primarily described for use in procedures for treating de Quervain's tenosynovitis and trigger thumb ("trigger thumb release" or "TTR" procedure). The de Quervain's procedure involves cutting the sheath around the two tendons on the thumb side of the wrist. The trigger thumb release procedure involves cutting an A1 pulley in a thumb to release/relieve tension on the flexor pollicis longus tendon. In alternative embodiments, the devices described in this application may be used, or adapted for use, in other parts of the hand, wrist, or body, to cut other soft tissues. For example, the devices and methods described herein may be used (or adapted for use) in treating trigger finger in the other fingers of the hand. Other examples of treatments that may be performed using the methods and devices described in this application include, but are not limited to, cubital tunnel release, extremity compartment release for compartment syndrome, and other fascial tissue releases. Therefore, although this application focuses on de Quervain's and trigger thumb treatments, the devices and methods herein are not limited to those uses. Additionally, any device or method described herein for treating trigger thumb may be used or adapted for use in treating de Quervain's tenosynovitis, and vice versa.

The procedures described herein are typically, but not necessarily, performed under ultrasound guidance, with an ultrasound device positioned outside the hand and/or wrist to visualize structures inside the hand and/or wrist. Additionally or alternatively, an ultrasound transducer may be incorporated into the surgical device itself, so that ultrasound visualization is provided directly inside the hand.

The embodiments of devices and methods described herein are examples only. Any given embodiment may include features of other described embodiments or may be altered or adapted for alternative uses, without departing from the scope of the invention.

In this application, the term "distal" generally means "close to or in a direction toward target tissue," and the term "proximal" generally means "farther from or in a direction away from the target tissue." In other words, proximal and distal are relative terms. For example, when a user holds a treatment device and inserts one end of the treatment device into a patient to perform a treatment, the end of the device that is inserted into the patient will be referred to as the "distal end" of the device. The end of the device being held by the physician will be referred to as the "proximal end" of the device. Although these terms will be used consistently in this application, they should not be interpreted as limiting.

Referring now to FIGS. 1A-1D, one embodiment of a thumb treatment device 100 is illustrated. The thumb treatment device 100 may be used, for example, to treat trigger thumb by performing a trigger thumb release ("TTR") procedure. As mentioned above, the thumb treatment device 100 may alternatively be used for other procedures, such as trigger finger release on a finger other the thumb, etc.

In the embodiment of FIGS. 1A-1D, the thumb treatment device 100 includes a soft tissue cutting device 101 and a neurovascular guard 120. The soft tissue cutting device 101 is described in detail in U.S. patent application Ser. No. 17/733,532, entitled "CUTTING DEVICE FOR TRIGGER FINGER AND OTHER SOFT TISSUES," filed Apr. 29, 2022, and U.S. patent application Ser. No. 18/102,990, entitled "TRIGGER THUMB TREATMENT DEVICES AND METHODS," filed Jan. 30, 2023, both of which are hereby incorporated by reference in their entireties.

In the illustrated embodiment, the soft tissue cutting device 101 includes a handle 102, a blade slider 104, a post 105 that locks the blade slider 104 in position on the handle 102, an introducer shaft 106 with an introducer tip 112, a blade 108 with a blade shaft 109, and a slot 110 on the handle 102 for accommodating a portion of the neurovascular guard 120. The neurovascular guard 120 includes a guard handle 122, a textured finger slide 124 (the texture enhancing finger gripping ability), a guard shaft 126, and an atraumatic tip 128. When assembled, as in FIGS. 1A and 1B, the neurovascular guard 120 fits into the slot 110, for example via snap fit, so that it can slide along the slot 110. The neurovascular guard 120 can be moved from a retracted position (FIG. 1A) to an advanced (or "extended") position (FIG. 1B). In the advanced position, the atraumatic tip 128 of the neurovascular guard 120 is positioned at or near the introducer tip 112. In use, the neurovascular guard 120 is advanced, then the blade 108 is advanced so its tip is located at or near the introducer tip 112 and the atraumatic tip 128, between the upper surface of the introducer shaft 106 and the lower surface of the guard shaft 126. The blade 108 is then rotated, so the proximally facing cutting surface of the blade 108 is approximately perpendicular (or close to perpendicular), relative to the guard shaft 126 and the introducer shaft 106, with the target tissue to be cut located between the guard shaft 126 and the introducer shaft 106 and proximal of the cutting edge of the blade 108. The slider 104 is then slid proximally along the handle 102 to cause the blade 108 to cut the target tissue, while nearby nerve and vascular tissues are protected from the blade 108 by the guard shaft 126. In some embodiments, the treatment device 100 may include a locking feature to lock the neurovascular guard 120 in the advanced position while performing a tissue cutting procedure. Optionally, the treatment device may also include an additional locking feature to lock the neurovascular guard 120 in a retracted (or most proximal) position, for storage and before the neurovascular guard 120 is deployed.

The neurovascular guard 120 is designed to protect nerve (s) and/or blood vessels in the thumb from the blade 108 during a soft tissue cutting procedure. As nerves in the thumb are typically closer to the area for cutting the A1 pulley than nerves in the other fingers are, the neurovascular guard 120 may be critically important for performing a safe trigger thumb release procedure with the device 100. This may be equally important in cutting the sheath to treat de Quervain's tenosynovitis. In some embodiments, the neurovascular guard 120 is a monolithic structure made of a material that at least partially allows ultrasound waves to pass through it—in other words, the neurovascular guard 120 may be at least partially ultrasound lucent. To achieve this property, the neurovascular guard 120 may be made of any suitable ultrasound lucent material, such as any polymer with physical properties that allow adequate through-transmission or posterior enhancement, such as but not limited to polyetherimide (PEI), such as ULTEM®, PEEK, PPS, or the like. This specific polymer property will allow the user to create an ultrasound image deep to the neurovascular guard 120, making visible the introducer shaft 106 and the blade 108 during placement and transection of the A1 pulley.

In different embodiments, the thumb treatment device 100 may have different lengths for treating different anatomical areas in the thumb (or alternatively other areas of the body). For example, an embodiment of the thumb treatment device 100 used to treat de Quervain's may have several longer portions than another embodiment used to treat trigger thumb. For example, the introducer shaft 106, the blade shaft 109, and the guard shaft 126 may all have differing lengths in different embodiments—e.g., longer for de Quervain's; shorter for trigger thumb.

Figure 2B:
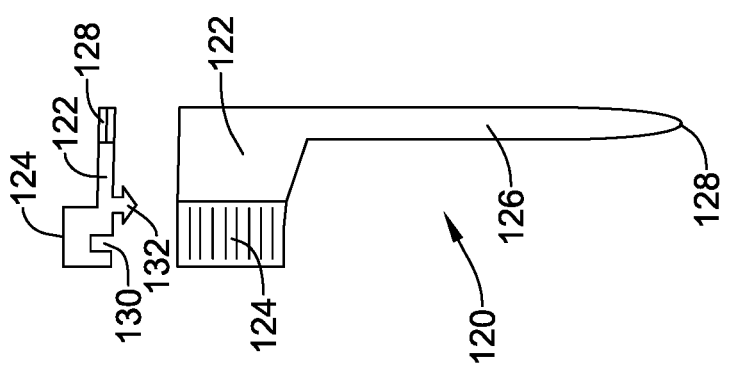
FIG. 2B is a top view (lower panel) and front view (upper panel) of the neurovascular guard of FIG. 2A.
Figure 2A:
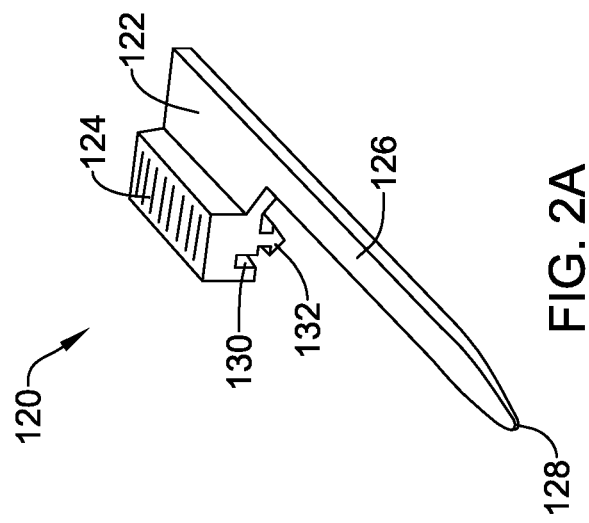
FIG. 2A is a top perspective view of the neurovascular guard of the trigger thumb treatment device of FIGS. 1A and 1B.

Referring now to FIGS. 2A-2C, the neurovascular guard 120 is illustrated in further detail. FIG. 2A is a perspective view, FIG. 2B is a top view (bottom panel) and front view (top panel), and FIG. 2C is a bottom view (bottom panel) and rear view (top panel). These figures show that the neurovascular guard 120 may include a guard slot 130 and a prong 132. The prong 132 is configured to snap-fit down into the slot 110 on the handle 102 of the device 100. The guard slot 130 is for receiving a longitudinal protrusion on the top surface of the handle 102, which is an optional feature. These features are designed for connecting the neurovascular guard 120 to the handle 102 of the thumb treatment device 100 in a way that allows the neurovascular guard 120 to slide back and forth along the handle 102.

Figure 4:
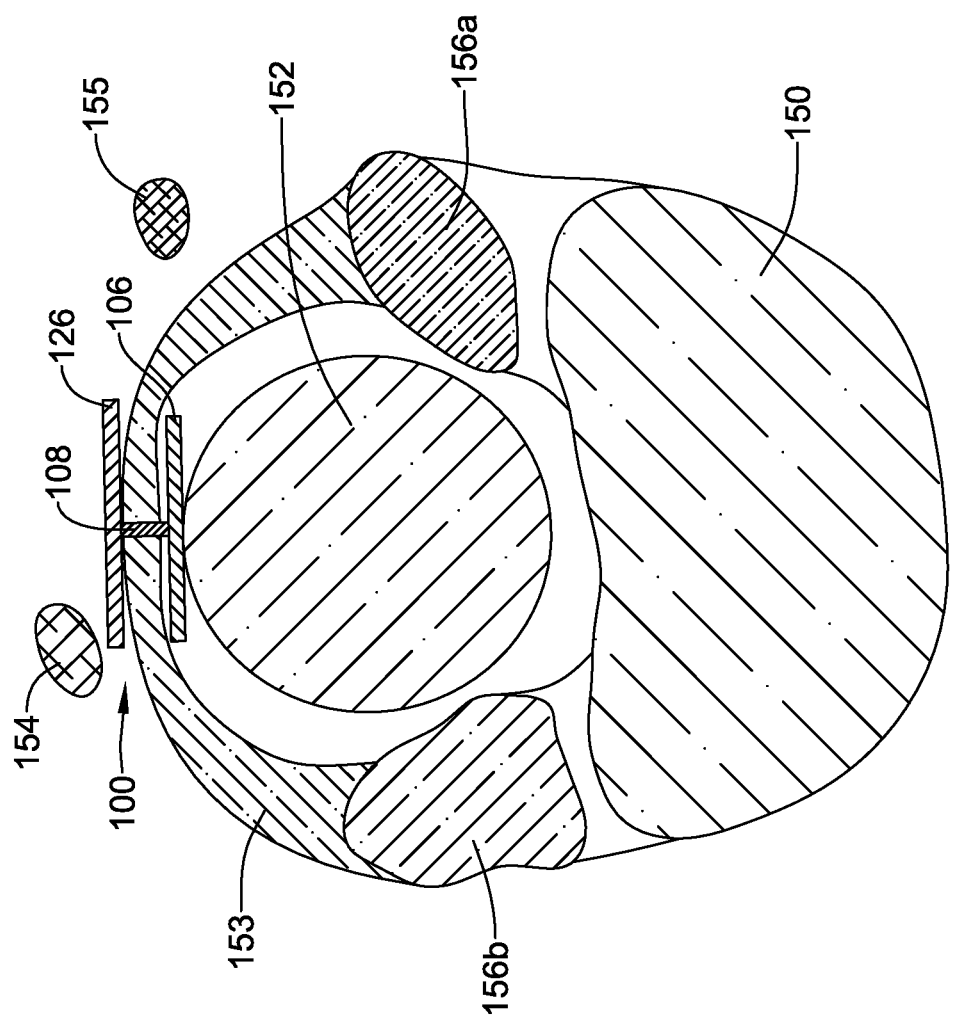
FIG. 4 is a frontal, cross-sectional view of a portion of a thumb, illustrating a method for treating trigger thumb, according to one embodiment.

Referring now to FIGS. 3A, 3B and 4, a method for performing a trigger thumb release procedure using the trigger thumb treatment device 100 will be described. First, the anatomy shown in the figures will be described, with FIGS. 3A and 3B being lateral, cross-sectional views, and FIG. 4 being a frontal, cross-sectional view. The anatomical parts shown in FIGS. 3A and 3B are a first metacarpal bone 150, a first proximal phalanx 151, a flexor pollicis longus (FPL) tendon 152, and an A1 pulley 153. FIG. 4 also shows radial and ulnar digital nerve branches 154, 155 and two sesamoid bones 156a, 156b.

Referring to FIG. 3A, in one method embodiment, after surgical preparation with a sterile field and local anesthetic, the thumb is positioned in a slightly extended position with the palm up. Under ultrasound guidance, a small (e.g., 5 mm) horizontal incision is made approximately at the midpoint between the interphalangeal (IP) crease and the metacarpal phalangeal (MCP) crease, in a distal to proximal direction, down to the FPL tendon. Then, the introducer tip 112 is used to provide gentle blunt dissection of the region just superficial to the A1 pulley 153. Thereafter, the introducer tip 112 is advanced through the tendon sheath, superficial to the FPL tendon 152, and distally deep to the A1 pulley 153 (as shown in FIG. 3A). The neurovascular guard 120 is unlocked and pushed via the finger slide 124 to the most distal position, so that the guard shaft 126 is superficial to the A1 pulley 153.

Referring to FIG. 3B, the slider 104 (or "blade handle") is then removed from the post 105 and is slid distally along the handle 102 in the horizontal, inactive position (with the blade 108 also horizontal or close to horizontal), to place the blade 108 deep to the A1 pulley 153. The slider 104 is then rotated approximately 90 degrees (counterclockwise), placing the blade 108 in the active (or "vertical" or "perpendicular") position. At this point, the blade 108 is sandwiched between the introducer shaft 106 and the shaft 126 of the neurovascular guide 120, with the blade in a perpendicular (or nearly perpendicular) orientation relative to the two shafts 106, 126. The A1 pulley 153 is similarly sandwiched between the introducer shaft 106 and the shaft 126 of the neurovascular guide 120, and it is located proximally relative to the cutting edge of the blade 108. The slider 104 is then pulled proximally, transecting the A1 pulley 153 with the blade 108, with the neurovascular guide 120 preventing the blade 108 from cutting any of the structures lying above it. After the cut is made, the neurovascular guard 120 is slid proximally via the finger slide 124. The introducer shaft 106 may then be used to confirm complete A1 pulley transection, for example by pulling upward on the handle 102, and is then removed from the patient. If the physician is uncertain that the A1 pulley has been fully transected, the above procedure may be repeated by advancing the neurovascular guard 120 again and repeating the cutting and confirming procedure.

FIG. 4 is an end-on view, showing the introducer shaft 106, the guard shaft 126, and the blade 108, in a position just before cutting the A1 pulley. This view shows the proximity of nerves 154, 155 and thus the importance of the neurovascular guard 120. It also illustrates the orientation of the blade 108 relative to the introducer shaft 106 and the neurovascular guard shaft 126 and the "sandwiching" of the blade 108 between the two shafts 106, 126.

Referring now to FIGS. 5A and 5B, a distal portion of an alternative example of a neurovascular guard 320 is illustrated in top view (FIG. 5A) and side view (FIG. 5B). The proximal portion of the neurovascular guard 320 may be configured the same as, or similar to, the proximal portion of the neurovascular guard 120 pictured in FIGS. 1A-2C. In the embodiment of FIGS. 5A and 5B, the neurovascular guard 320 includes a guard shaft 326 with a slot 332 that has a wide distal opening 328 and a wide proximal opening 330. A different embodiment of a blade 308 may be used with this neurovascular guard 320. This blade 308 includes a cutting edge 209, a blade shaft 312 and a blade capture plateau 310 located at the top of the distal portion of the blade 308. When the blade 308 and the neurovascular guard 320 are positioned at or near the distal end of the introducer shaft 106, as shown toward the righthand portions of FIGS. 5A and 5B, the blade 308 may be rotated from the horizontal position to the vertical position, in which the blade capture plateau 310 (now in a horizontal position) is free to pass through the wide distal opening 328. As the blade 308 slides proximally to cut tissue, the blade capture plateau 310 is wider than the slot 332 and thus is "captured" above the top surface of the neurovascular guard 326. FIGS. 5A and 5B both show the blade 308 in a distal position (to the right) and in a more proximal position (to the left), as when the A1 pulley or other target tissue has been cut.

The slot 332 and the blade capture plateau 310 act like a track to keep the blade 308 and the neurovascular guard 320 oriented consistently relative to one another during a tissue cutting procedure. This embodiment of the neurovascular guard 320 is merely one example, and the slot 332, wide distal opening 328, and wide proximal opening 330 are optional features. In alternative embodiments, the slot 332, wide distal opening 328, and wide proximal opening 330 may be included on the neurovascular guard 120 described above or on other embodiments of neurovascular guards.

Figure 6:
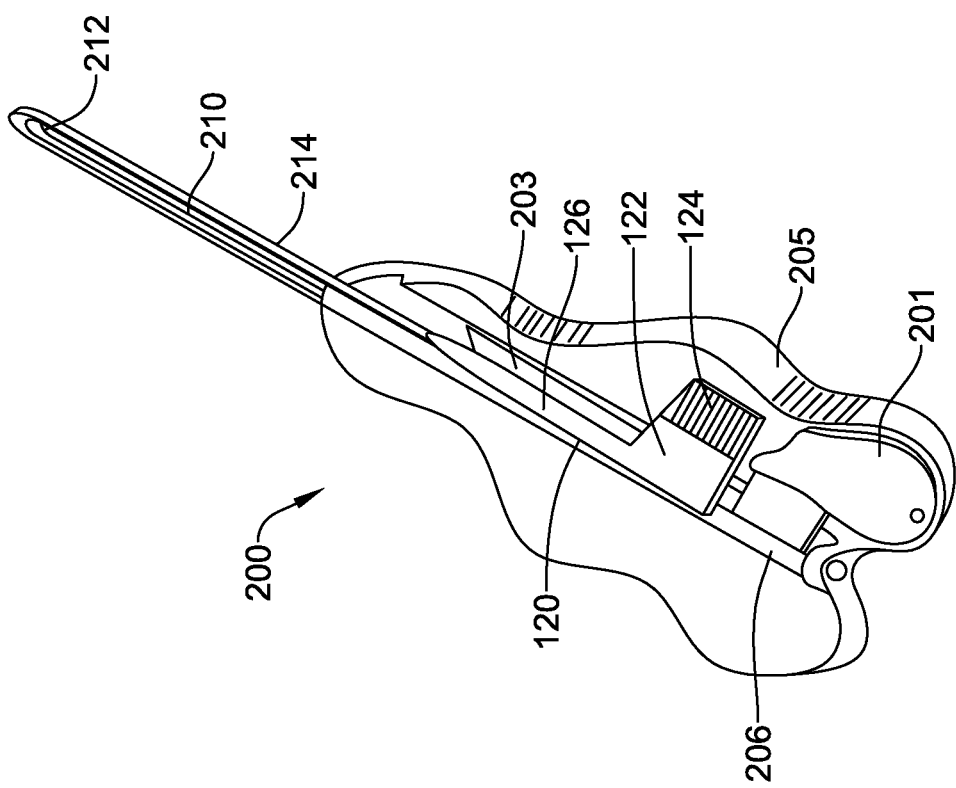
FIG. 6 is a perspective view of a treatment device used for treating de Quervain's tenosynovitis, according to one embodiment.

Referring to FIG. 6, one embodiment of a de Quervain's treatment device 200 (hereafter simply "treatment device 200") is illustrated. In treating de Quervain's tenosynovitis surgically, it is often necessary to cut a septum of the sheath and another portion of the sheath. The septum is oriented somewhat vertically, relative to the other portion of the sheath—in other words, the two portions to be cut are approximately perpendicular to one another. For simplicity, this description will refer to the septum orientation as vertical and the other sheath portion orientation as horizontal. This is for description purposes only, however, as either of these two tissue portions may have any of a number of orientations in various embodiments. In general, the two portions simply have different orientations relative to one another.

FIG. 6 is a perspective view of the treatment device 200, showing an introducer handle 205, a blade slider 201, an upper deck 203, an upper guideway 206, a blade shaft 210, a blade 212, and an introducer shaft 214. The treatment device 200 also includes the neurovascular guard 120 described previously, which may have a different size for this treatment device 200. For example, the guard shaft 126 may be longer that in the version used with the treatment device 100, to match a longer introducer shaft 214 of the treatment device 200. The neurovascular guard 120 is an optional feature and may be included in some embodiments and not others. The structure and operation of the treatment device 200 are similar to those of the treatment device 100, except that the blade shaft 210 and blade 212 are able to rotate into two different levels of the treatment device 200, one for cutting in a first orientation (e.g., a "vertical orientation") and the other for cutting in a second orientation (e.g., a "horizontal orientation").

Figure 7:
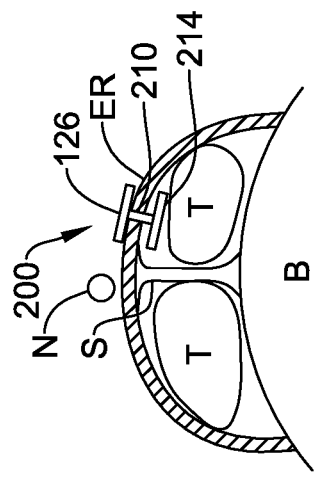
FIG. 7 is a cross-sectional view of a wrist, illustrating placement of a de Quervain's treatment device, according to one embodiment.

FIG. 7 is a cross-sectional view of a portion of the wrist showing the treatment device 200 in position to cut an extensor retinaculum ER to treat de Quervain's tenosynovitis. Other anatomical structures shown are bone B, tendons T, septum S, and nerve N. In some de Quervain's procedures, the treatment goal is to cut the extensor retinaculum ER and the septum S. Using the treatment device 200, the physician may move the blade shaft 210 and blade 212 to two different orientations—a more vertical orientation for cutting the extensor retinaculum ER and a more horizontal orientation for cutting the septum S. This utility is described in more detail immediately below.

FIG. 8A is a perspective view of the de Quervain's treatment device 200, with the blade slider 201 and the neurovascular guard 120 removed to show further detail of the treatment device 200. FIGS. 8B-8D are posterior, cross-sectional views of the treatment device 200, showing the blade slider 201 (and thus the blade shaft 210 and the blade 212, which are not visible in these figures) in three different orientations (or "positions") for performing different stages of a de Quervain's treatment procedure. Similarly, FIG. 8A shows the blade shaft 210 and the blade 212 in two different orientations—blade center horizontal BCH and blade offset horizontal BOH. FIGS. 8B-8D show how the blade slider 201 and blade shaft 210 are moved from one orientation to another. FIG. 8B shows the blade slider 201 in the blade center horizontal BCH orientation. FIG. 8C shows the blade slider 201 in another orientation, referred to as the blade center vertical BCV orientation. And FIG. 8D shows the blade slider 201 in the blade offset horizontal BOH orientation. These three orientations and their functions are described immediately below.

Referring to FIG. 8A, the blade shaft 210, which is attached to the blade slider 201 at one end and extends to the blade 212 at the opposite end, can be moved from a blade center horizontal BCH position, where the blade slider 201 rests on an upper deck 203, to a blade offset horizontal BOH position, where the blade slider 201 rests on a lower deck. The upper deck 203 extends along only a proximal portion of the introducer handle 205 of the treatment device 200. Referring to FIG. 8B, with the blade slider 201 resting on the upper deck 203 and the blade shaft 210 in the blade center horizontal BCH position, the blade slider 201 can be advanced along the introducer handle 205 to advance the blade 212 to a location at or near the distal end of the introducer shaft 214. In the blade center horizontal BCH position, as illustrated in FIG. 8D, the blade slider 201 rests on the upper deck 203 and is connected to the blade shaft 210, which in turn is connected to a blade pivot 202. The blade pivot 202 rests in and slides along an upper guideway 206. Thus, the blade center horizontal BCH position is used for advancing the blade 212 to a distal position, in preparation for starting a treatment. When a de Quervain's treatment procedure is complete, the blade 212 may be returned to the blade center horizontal BCH position and either left at or near the distal end of the introducer shaft 214 or retracted to a more proximal location by sliding the blade slider 201 proximally along the upper deck 203. In other words, the blade center horizontal BCH position or orientation may be thought of as an inactive or treatment preparation position.

Once the treatment device 200 is in position for a de Quervain's procedure, the physician may choose to cut the extensor retinaculum first and then cut the septum, to cut the septum first and then extensor retinaculum, or to cut only the extensor retinaculum. Although one example is described here, any combination and order of cuts of any suitable target tissue(s) may be performed using the treatment device 200.

In one example, referring to FIG. 8C, the blade slider 201 may be rotated to a more vertical orientation, the blade center horizontal BCV orientation, by flipping the blade slider 201 upward, causing the blade pivot 202 to rotate in the upper guideway 206. The blade slider 201 may then be slid proximally along the introducer handle 205, causing the proximally facing cutting edge of the blade 212 to cut the extensor retinaculum. If the physician believes the extensor retinaculum is not sufficiently cut on a first past of the blade 212, the blade slider 201 may be advanced and retracted to cut additional tissue in the blade center vertical BCV orientation.

Referring now to FIGS. 8A and 8D, after the extensor retinaculum has been cut (or before it has been cut in some examples), the blade shaft 210 may be moved to the blade offset horizontal BOH position, where the blade slider 201 rests on a lower deck 204 of the introducer handle 205 and the blade pivot 202 rests in a lower guideway 207. The blade slider 201 may be moved to this position by sliding the blade pivot 202 down from the upper guideway 206 to the lower guideway 207 in the area of the introducer handle 205 just distal to the upper deck 203. Again, the upper deck 203 separates the upper guideway 206 from the lower guideway 207 but only extends along a portion of the introducer handle 205, thus leaving room toward the distal end of the introducer handle for the blade pivot 202 to move up or down between the two guideways 206, 207.

In one example of a procedure using the de Quervain's treatment device 200, the physician may first advance the introducer shaft 214 through a small incision, under ultrasound guidance, to position the introducer shaft 214 below (or "deep to") the extensor retinaculum (or other target tissue in other examples). When the introducer shaft 214 is in a desired position, which again may be confirmed using ultrasound visualization, in embodiments that include the neurovascular guard 120, the neurovascular guard 120 may be advanced along the introducer handle 205, to position a distal tip of the guard shaft 126 at or near the distal tip of the introducer shaft 214 and above the extensor retinaculum. The blade slider 201 is then advanced distally in the blade center horizontal BCH orientation (FIG. 8B), with the blade pivot 202 in the upper guideway 206, until the blade 212 is located below and distal to the target tissue. In this position, the blade 212 is located between the introducer shaft 214 and the neurovascular guard shaft 126. The blade slider 201 is then rotated from the blade center horizontal BCH orientation to the blade center vertical BCV orientation (FIG. 8C), thus orienting the cutting edge of the blade 212 approximately perpendicular to and just beyond (distal to) the target tissue (extensor retinaculum). At this point, the blade 212 and the extensor retinaculum are sandwiched between the introducer shaft 214 and the guard shaft 126, with the cutting edge of the blade 212 just distal to the extensor retinaculum that is to be cut.

Next, with the blade slider 201 still in the blade center vertical BCV orientation and the blade pivot 202 in the upper guideway 206, the physician slides the blade slider 201 proximally along the introducer handle 205 to cut through the extensor retinaculum. If the physician wants to then cut a more vertically oriented tissue—e.g., oriented at approximately a 90-degree angle relative to the introducer shaft 214—such as the first extensor compartment septum, the blade slider 201 may be flipped back to the blade center horizontal BCH orientation. The blade slider 201 may then be advanced distally, past the distal end of the upper deck 203, and then laterally and downward, to move the blade pivot 202 from the upper guideway 206 to the lower guideway 207. The blade slider 201, blade shaft 210, and blade 212 are now in the blade offset horizontal BOH orientation (FIGS. 8A and 8D). In this orientation, the cutting edge of the blade 212 extends laterally beyond one edge of the introducer shaft 214, so that when the blade 212 slides proximally, it can cut through tissue just lateral of the introducer shaft 214. In fact, that is the next step in the cutting process. When the physician determines, again possibly via ultrasound guidance, that the blade 212 is in a desired position to cut a target tissue, such as the first extensor compartment septum, the blade slider 201 in the blade offset horizontal BOH orientation, on the lower deck 204, is slid proximally to transect the septum. After that cut is completed, the blade slider 201 may be moved back to the upper deck 203, with the blade pivot 202 in the upper guideway 206, and retracted to a proximal, inactive position. The neurovascular guard 120 may be left in an advanced position or pulled back to a more proximal position. The introducer shaft 214 may then be removed from the patient's wrist. As mentioned above, in alternative examples, the order of tissues cut and/or the target tissues cut may be altered.

FIGS. 9A-9C are top, side, and front views, respectively, of another embodiment of a treatment device 250 for treating de Quervain's tenosynovitis. In this embodiment, the treatment device 250 includes an introducer handle 252 coupled with an introducer shaft 254 that has a forward cutting blade 262 on its distal end. The treatment device 250 also includes a blade slider 256 coupled with the introducer handle 252 and a blade shaft 258, which ends in a hook blade 260 at its distal end. Using this embodiment, the introducer shaft 254 may be introduced into the patient's hand and the forward cutting blade 262 may be pushed through the septum to cut the septum. The blade slider 256 may then be flipped up to turn the hook blade 260 up into a more vertical position, relative to the introducer shaft 254. The blade slider 256 may then be retracted to cause the hook blade 260 to cut the extensor retinaculum (or other tissue as desired). Before extracting the device from the patient, the blade slider 256 may be flipped back down onto the upper surface of the introducer handle to position the hook blade 260 in a flatter, inactive position.

Figure 10:
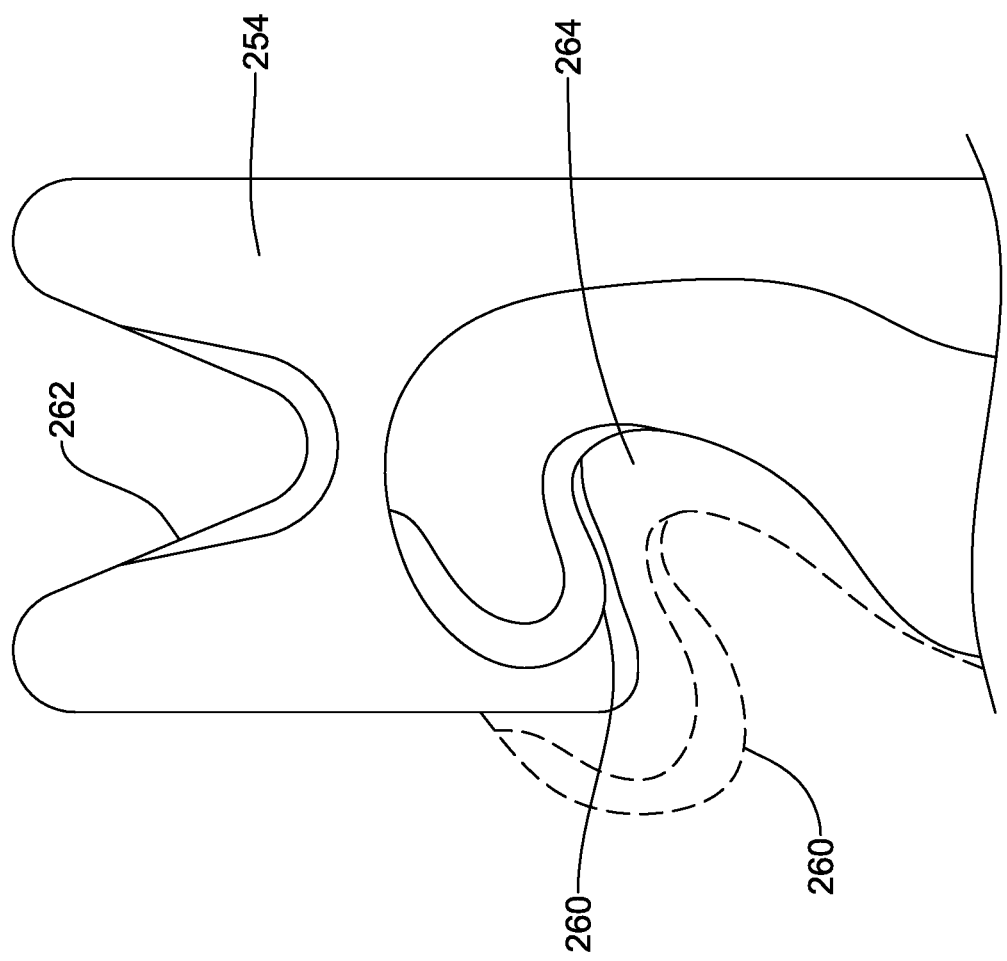
FIG. 10 is a close-up, top view of a distal portion of the treatment device of FIGS. 9A-9C, illustrating one embodiment of a way to move a blade of the device to cut tissue.

Alternatively, as illustrated in FIG. 10, the blade slider 256 may be pulled back in the flat position, with the hook blade 260 approximately horizontal, to cut tissue through an open area 264 in the introducer shaft 254. In this embodiment, the introducer handle 252 and thus the whole treatment device 250 may be rotated between two different cutting planes during the procedure to cut two different tissues. Also, as illustrated by the dotted-line portion of FIG. 10, the blade slider 256 may be rotated slightly in a lateral orientation relative to the introducer handle 252 to cause the blade 260 to move out laterally from the introducer shaft 254. In this orientation, the blade 260 can cut tissue just lateral of the edge of the introducer shaft 254. Although not described above, the treatment device 250 may optionally include the neurovascular guard 120 or a similar embodiment thereof.

Although the foregoing is believed to be a complete and accurate description of embodiments and features, the invention is not limited to any of the examples or embodiments described herein.

What is claimed is:
1. A device for treating de Quervain's tenosynovitis, the device comprising:
   a handle;
   an introducer shaft extending from the handle;
   a blade, comprising:
      a blade shaft extending along a top surface of the introducer shaft and onto the handle; and
      a blade cutting edge that faces towards the handle;
   a blade slider attached to a proximal portion of the blade shaft;
   a blade pivot attached to at least one of the proximal portion of the blade shaft or the blade slider, wherein the blade pivot is configured to allow the blade slider to rotate in a plane that is perpendicular to a plane of the introducer shaft;
   an upper deck along which the blade slider slides in an upper horizontal orientation; and
   a lower deck along which the blade slider slides in a lower horizontal orientation.

2. The device of claim 1, further comprising a neurovascular guard disposed over the blade, wherein the neurovascular guard is configured to slide along the handle and the introducer shaft.

3. The device of claim 2, wherein the neurovascular guard is made of a material that allows passage of ultrasound waves.

4. The device of claim 3, wherein the material is selected from the group consisting of polyetherimide (PEI), PEEK, PPS, and other polymers.

5. The device of claim 2, wherein when the neurovascular guard is placed in an advanced position, a distal tip of the neurovascular guard is located at or near a distal tip of the introducer shaft, and wherein the blade cutting edge is located between the introducer shaft and the neurovascular guard.

6. The device of claim 1, further comprising:
   an upper guideway adjacent the upper deck; and
   a lower guideway adjacent the lower deck,
      wherein the blade pivot rests in and slides along the upper guideway when the blade slider is on the upper deck and the lower guideway when the blade slider is on the lower deck.

7. The device of claim 6, wherein the upper deck extends along only a portion of the handle, forming an opening through which the blade pivot can move between the upper guideway and the lower guideway.

8. The device of claim 7, wherein the blade slider is configured to move between three orientations via the blade pivot, the three orientations comprising:
   a blade center horizontal orientation, in which the blade pivot rests in the upper guideway and the blade slider rests on the upper deck;
   a blade center vertical orientation, in which the blade pivot rests in the upper guideway and the blade slider is rotated to a more vertical position off of the upper deck; and
   a blade center offset orientation, in which the blade pivot rests in the lower guideway and the blade slider rests on the lower deck.

9. The device of claim 8, wherein the blade cutting edge in the blade center offset orientation extends laterally beyond an edge of the introducer shaft.

10. The device of claim 1, wherein the blade pivot is configured to allow the blade cutting edge to cut a first tissue in approximately a horizontal plane relative to a plane of the introducer shaft and to cut a second tissue in approximately a vertical plane relative to the plane of the introducer shaft.

11. A method for treating de Quervain's tenosynovitis in a wrist of a patient, the method comprising:
   advancing an introducer shaft of a treatment device under an extensor retinaculum;
   rotating a blade in an upper guideway of the treatment device to a first orientation that is approximately perpendicular to the introducer shaft, to position a cutting edge of the blade distal to the extensor retinaculum;
   moving the blade proximally to cause the cutting edge to cut through the extensor retinaculum;
   moving the blade from the upper guideway to a lower guideway in a second orientation that is approximately horizontal to the introducer shaft, wherein the cutting edge in the second orientation extends laterally beyond an edge of the introducer shaft; and
   moving the blade proximally to cause the cutting edge to cut through a septum.

12. The method of claim 11, further comprising visualizing at least part of the method using an ultrasound device located outside of the patient.

13. The method of claim 11, further comprising advancing a neurovascular guard along the introducer shaft before rotating the blade into the first orientation, wherein the blade is located between the introducer shaft and the neurovascular guard.

14. The method of claim 13, further comprising advancing the blade along the introducer shaft after advancing the neurovascular guard along the introducer shaft and before rotating the blade into the first orientation.

15. The method of claim 11, further comprising advancing the blade along the introducer shaft after advancing the introducer shaft and before rotating the blade, wherein the blade is advanced along the introducer shaft in a third orientation wherein the blade is in the upper guideway and is approximately horizontal to the introducer shaft.

16. The method of claim 15, wherein the blade is coupled with a blade slider configured to slide along a handle of the treatment device to slide the blade distally and proximally, and wherein the blade is further coupled with a blade pivot configured to rest in and slide along the upper guideway and the lower guideway.

17. The method of claim 16, wherein moving the blade from the upper guideway to the lower guideway comprises moving the blade pivot through an opening in an upper deck of the treatment device to position the blade slider on a lower deck of the treatment device.

18. The method of claim 11, wherein the septum comprises a first extensor compartment septum.

19. The method of claim 11, wherein the septum is cut before the extensor retinaculum is cut.

20. The method of claim 11, wherein moving the blade comprises at least one of sliding or rotating a blade slider of the treatment device along a handle of the treatment device, and wherein the blade slider is coupled with a blade shaft of the blade that extends to the cutting edge of the blade.

* * * * *